Dec. 8, 1953  D. CLEGG ET AL  2,662,212
TELEMETERING MECHANISM FOR CHART RECORDERS
Filed May 14, 1951
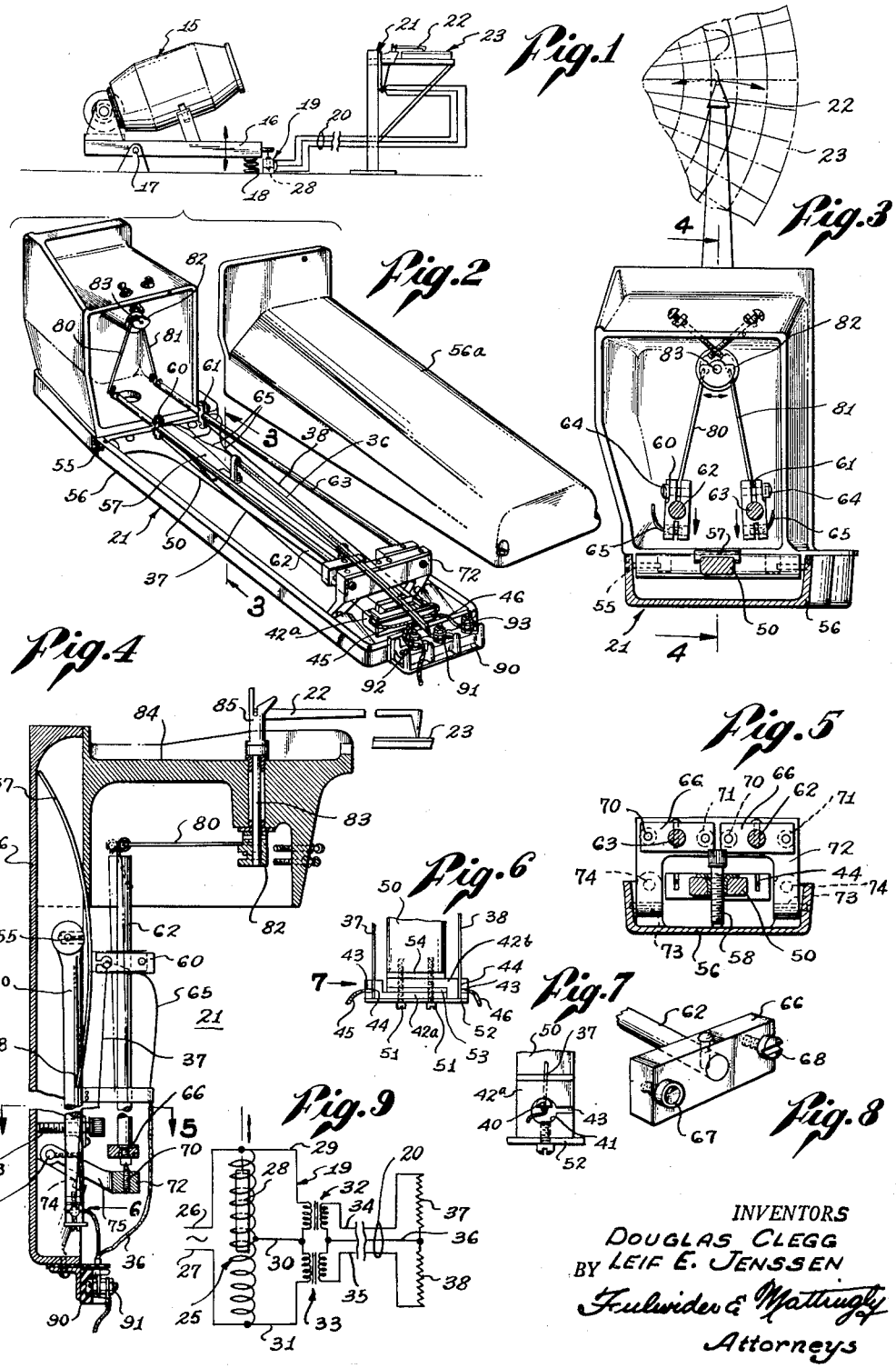
INVENTORS
DOUGLAS CLEGG
BY LEIF E. JENSSEN
Fulwider & Mattingly
Attorneys Patented Dec. 8, 1953

2,662,212

UNITED STATES PATENT OFFICE 2,662,212

TELEMETERING MECHANISM FOR CHART RECORDERS

Douglas Clegg and Leif E. Jenssen, Calistoga, Calif.; said Jenssen assignor to said Clegg Application May 14, 1951, Serial No. 226,154

4 Claims. (Cl. 324—106)

The present invention relates generally to telemetering apparatus, and more particularly to apparatus of this type in which the position of a movable element is continuously indicated and recorded at a point remote from such movable element. The instrument and system illustrated herein as embodying the invention are capable of use in a wide variety of different places in industry, such, for example, as remotely indicating liquid level gauges, remotely indicating flow meters, weighing scales, position indicators, direction indicators, and so forth. For purposes of illustration herein, the device is shown connected to a batch-type concrete mixer for the purpose of indicating and continuously recording the viscosity of the concrete being mixed. It will be realized by those skilled in the art that the device is not limited to the particular embodiment illustrated herein, but is capable of many other analogous uses.

Remotely indicating meters and recorders of the type above indicated have been known and used for a considerable period of time, but have always been heir to certain difficulties which it is the general purpose of the present invention to overcome. For example, conventional electrically indicating devices of this type are often sensitive to line voltage changes, which changes introduce spurious indications on the recording chart. While elaborate bridge networks for eliminating the effect of such line voltage changes have been devised, these often require a complex and highly sensitive receiving and recording mechanism which is both expensive to build and difficult to maintain in correct operative adjustment.

Another difficulty often encountered in previous apparatus of the class under discussion is that occasioned by small transient movements of the movable element, the position of which it is desired to record. Such small and sudden movements, if reflected in motion or attempted motion of the recording pen, may have various deleterious effects, such, for example, as producing a discontinuity in the chart line, throwing ink from the pen, or even in severe cases throwing the pen out of the recording mechanism. Accordingly it is desirable to incorporate, in devices of this type, means for damping out or otherwise obviating the effects of such sudden transient movements. It is important, however, that such damping means be such as to absorb little or no power from the telemetering system.

Bearing in mind the foregoing discussion, it is a major object of the present invention to provide in telemetering apparatus of the class described a receiving and recording element which is of simple and rugged construction whereby to be inexpensive to manufacture and easy to maintain in working order.

Another object of the invention is to provide such apparatus in which the response of the receiving and recording element is sufficiently slow as to damp out undesired sudden and transient signals.

Still a further object of the invention is to provide apparatus of the class described in which no power is absorbed from the telemetering signal by reason of any damping means introduced in the system.

A still further object of the invention is to provide an apparatus of the class described which is substantially insensitive to variations in line voltage.

The foregoing and additional objects and advantages of the invention will be apparent from the following detailed description of one embodiment thereof, consideration being given likewise to the attached drawings, in which:

Fig. 1 is a semi-schematic elevational view of a telemetering system embodying the invention, such system being employed to indicate and continuously record the viscosity of concrete in a batch-type concrete mixer;

Fig. 2 is a perspective view of the receiving and recording element of the apparatus shown in Fig. 1 as seen from beneath the housing cover being removed to reveal the underlying structure;

Fig. 3 is a horizontal section taken on the line 3—3 in Fig. 2;

Fig. 4 is an elevational section taken on the line 4—4 in Fig. 3;

Fig. 5 is a horizontal section taken on the line 5—5 in Fig. 4, and rotated 90 degrees;

Fig. 6 is a fragmentary elevational view as seen from the direction indicated by the arrow 6 in Fig. 4;

Fig. 7 is a side elevational view of the portion shown in Fig. 6 as seen from the direction indicated by the arrow 7 in Fig. 6;

Fig. 8 is a perspective view of one end of a strut employed in the apparatus of Fig. 2; and Fig. 9 is a circuit diagram showing the operative electrical connections of the apparatus illustrated in Fig. 1.

In the drawings, we have indicated the concrete mixer generally by the reference character 15, the same being mounted on a horizontal pallet or base 16 which is pivotally supported adjacent its left-hand end by trunnion bearing 17, and at its right-hand end by compression springs 18. As the concrete being mixed in the mixer 15 becomes more viscous, it is forced more and more toward the upper or open end by the action of conventional helical blades within the mixer. The result of such movement in the mixer 15 causes the center of gravity of the entire structure comprising the mixer 15 and the pallet 16, to shift toward the right, thus compressing the supporting springs 18. Thus, it will be seen that the vertical movement of the right-hand end of the base 16 is an index of the viscosity of the concrete within the mixer 15.

The vertical motion of the base 16 is converted into variations in an electrical circuit by means of a movable core transmitter element 19, and such electrical variations are transmitted by a three-conductor transmission line 20 to a remotely situated receiver-recorder instrument 21 which includes the essential elements of the present invention. The electrical signals received by the receiver-recorder 21 are converted into movements of a conventional recorder pen 22 which records such data on a conventional circular recorder chart 23. Thus, in ultimate effect, the variations in concrete viscosity are continuously recorded on the chart 23.

The nature of the electric signals transmitted by the transmitter unit 19 is best understood from an examination of Fig. 9, wherein the circuit and connections are shown.

The transmitter unit 19 includes a center-tapped coil 25 which is fed by alternating current through leads 26 and 27. Movably supported within the coil 25 is a magnetic core 28, which core is connected to the movable element the position of which it is desired to indicate, e. g., the end of the base 16 in Fig. 1. As shown in Fig. 9, the length of the core 28 is substantially half that of the coil 25 so that as the core 28 is moved vertically it moves from one half of the coil 25 to the other. Thus the relative reactive impedances of the respective halves of the coil 25 are varied as the core 28 is moved vertically.

The two halves of the coil 25 are respectively connected to the primary windings of a pair of transformers 32 and 33, the connections being made by a center-tap lead 30 and end leads 29 and 31. The secondary windings of the transformers 32 and 33 are connected to the transmission line 20, the center conductor 36 being connected to a common side of each of the secondary windings, and the other terminals of the secondary windings being connected to outer conductors 34 and 35 of the transmission line 20. The conductors 34, 35, and 36 are connected in bridge fashion to a pair of resistance or expansion elements 37 and 38 forming parts of the receiving and recording instrument 21. The function of the resistance elements 37 and 38 will be described in more detail hereinafter.

The motion-producing or motor elements of the receiving and recording instrument 21 are the resistance elements 37 and 38 which are stretched ligaments of a material having a relatively high coefficient of expansion. The current flowing through the transmission line 20 may cause relatively greater heating of one or the other of the resistance elements 37 and 38, and thus causes greater expansion of the hottest element. The differential expansion (as between elements 37 and 38) is magnified by appropriate mechanical linkage and caused to move the pen 22.

The ligaments or resistance elements 37 and 38 are each provided with end terminal supports, the nature of which is best seen in Fig. 7, wherein it will be seen that each ligament 37 or 38 has secured thereto a short transverse cross bar 40 of semi-cylindrical shape. The cross bar 40 at the lower end (Fig. 4) of the element 37 is received in a cylindrical bore 41 in an end support member 42a. Slots 43 and 44 in the member 42a permit insertion of the cross bar 40 with the ligament 37 attached thereto. Flexible electrical conductors 45 and 46 are attached to the ligaments 37 and 38 so as to conduct the signal current directly to the ligaments without the intervention of a mechanical connection which might vary the resistance.

As can be seen in Fig. 6, a pair of end support members is provided, one for each of the ligaments 37 and 38, the two members being identified individually by the reference characters 42a and 42b. The members 42a and 42b are both secured to the lower end of a relatively fixed downwardly projecting anchor strut 50 by means of attachment screws 51, intervening insulation strips 52, 53, and 54 being provided to prevent the members 42a or 42b from coming into electrical contact with each other or with the strut 50.

The elements of the instrument 21 are mounted in a base or frame structure 56 and enclosed by a housing cover 56a. As previously stated, the strut 50 is relatively immovable during operation of the receiving and recording instrument 21, and thus may be considered part of the base or frame 56. For purposes of sensitivity adjustment, however, the anchor strut 50 may be pivoted inwardly or outwardly about a transverse axis 55 adjacent the upper end and by which it is pivotally secured to the base structure 56. A curved flat spring 57 is secured in a groove 58 in the strut 50, and is so stressed as to bear against the base structure 56 and urge the strut 50 in clockwise swinging motion about the axis 55 (Fig. 4). Such clockwise rotation of the strut 50 is limited by an adjustment screw 58 which is threaded through the strut 50 and bears against the inside surface of the base member 56. Thus the angular disposition of the strut 50 may be adjusted by means of the screw 58.

The upper ends of the ligaments 37 and 38 are individually secured to adjustable attachment members 60 and 61, the latter being slidably carried on movable struts 62 and 63, respectively, and secured thereto by means of clamping screws 64 whereby they may be moved longitudinally of the struts 62 and 63 and clamped at any desired position thereon. Flexible leads 65 are secured to the upper ends of the ligaments 37 and 38 and are electrically connected together at a common terminal corresponding to the conductor 36 shown in Fig. 9.

Each of the struts 62 and 63 is formed with a transverse foot member 66 in which are secured cone-slot bearing members 67 and 68, and each of the struts is rockably supported on its cone-slot bearings 67—68 by a pair of conical pivots 70—71, the latter being supported in the transverse arm of a U-shaped bracket 72, the lower ends of which are pivotally attached to the base member 56 by pivot rods 73. A pair of compression springs 74 anchored in the base member 56 and positioned against the inwardly extending arms 75 of the U-shaped member 72 urge the U-shaped member 72 in counterclockwise rotation, thus to thrust the pivots 70—71 against their respective bearings 67 and 68 to oppose the downward movement of the struts 62 and 63 occasioned by the tension in the ligaments 37 and 38.

The upper ends of the movable struts 62 and 63 are each connected by mechanical links 80 and 81 to a flanged member 82 which is in turn secured to a shaft 83 journally supported in an upper box-like portion 84 of the base structure 56. As can be seen best in Fig. 3, the attachments of the links 80 and 81 are on opposite sides of the rotary axis of the shaft 83 so that inward swinging force of either of the struts 62 or 63 acts through tension in one of the links 80 or 81 to cause rotation of the flanged member 82 in one direction or the other, as indicated by the double-headed arrow in Fig. 3. Normally, i. e., when the ligaments 37—38 are at the same temperature, the swinging forces of the struts 62—63 balance and the shaft remains in a neutral central position.

A yoke 85 is fixed to the upper end of the shaft 83, and carries the pen 22 therein in conventional manner so that rotation of the shaft 83 swings the pen back and forth, as indicated in Fig. 3.

It will now be seen that the inwardly swinging force of one of the movable struts, say 62, is opposed by the same force in the other strut, i. e. 63, due to the diametrically opposite connection of the connecting links 80 and 81. It will also be seen that such inwardly swinging movement of the struts 62 and 63 is urged by the tension of the ligaments 37 and 38, respectively. The greater the tension in the ligaments, the greater the force tending to swing the strut 62 or 63 inwardly. The tension in the ligaments 37 and 38 is, in turn, a function of the temperature thereof. That is, the greater the temperature of a ligament, tending to expand the same by thermal expansion, the less the tension therein. Accordingly it will be seen that shaft 83 is rotated in one direction or the other, depending on which of the two ligaments 37 and 38 is the hottest. The temperature of the ligaments depends, in turn, on the signal currents transmitted through the transmission line 20, and such currents depend, in turn, upon the position of the movable core 28. Thus it will be seen that in ultimate effect, the angular disposition of the pen 22 is dependent upon the position of the core 28 in the transmitting unit 19.

The swinging force exerted by the tension in the ligaments 37 and 38 will depend on the vertical-angular disposition of the ligaments 37 and 38. That is, as the angle between the ligament 37 and its connected strut 62 is increased, the couple or component of inward swinging force is increased for an equivalent tension in the ligament. Thus the degree of rotation of the shaft 83 occasioned by a given relative change in the temperatures of the two ligaments 37 and 38— that is to say, the mechanical advantage of the system—can be adjusted by swinging the inner or relatively fixed ends of the ligaments inwardly or outwardly toward or away from the base 56. Such adjustment is achieved as has been hereinbefore described by means of the adjustment screw 58, rotation of which permits the spring 57 to swing the strut 50 inwardly.

The electrical connections to the ligaments 37 and 38 are brought out to a terminal block 90, the upper ends being connected together and to a center terminal 91, and the lower or relatively fixed ends being connected, respectively, to terminals 92 and 93. Binding posts or other suitable connectors are provided in the block 90 to receive the individual conductors of the transmission line 20.

In operation the device just described is connected in the manner described, and supplied by alternating current delivered through the leads 26 and 27 to the transmitter element 19. Thereafter, vertical movement of the core 28 in the coil 25 causes a variation in the relative values of the currents flowing in the secondary windings of the transformers 32 and 33, respectively, which variation in currents effects the mechanical movement hereinbefore described. It will be noted that the thermal lag of the heating and cooling of the ligaments 37 and 38 effects a certain amount of damping so as to prevent damage to the recording instrument by reason of erratic or transient signal currents. Such damping effect, however, does not absorb power from the system in the manner of oil dashpots and similar contrivances.

Furthermore, it will be seen that the receiving and recording instrument 21 embodying the invention herein is comparatively rugged and does not depend for its successful operation on extremely light moving parts or friction-free jewel bearings such as are used in many recording microammeters and the like. Nevertheless, the overall system is relatively insensitive to variations in line voltage.

While the device shown and described herein is fully capable of achieving the objects and providing the advantages hereinbefore stated, it will be realized that it is capable of some modifications without departure from the spirit of the invention. For this reason, we do not mean to be limited to the form shown and described, but rather to the scope of the appended claims.

We claim:

1. An electric current indicating instrument of a type having a frame, a movable indicator therein, and an electro-sensitive motor element mechanically connected to said indicator, said motor element comprising in combination: a strut fulcrumed adjacent one end in said frame for swinging movement about a transverse axis and mechanically linked adjacent the other end to said indicator whereby said swinging movement effects movement of said indicator; an elongated electro-expansive element adapted for connection to a source of current to be measured, mechanically connected at one end to said strut and anchored to said frame at the other end at a point spaced from said axis, whereby expansions and contractions of said electro-expansive element as a result of variations in electric current passed therethrough exert moments on said strut to swing the same about said axis, said element being pre-stressed and disposed at an angle of less than ninety degrees to said strut whereby to exert an axial force thereon; and spring means interposed between said frame and strut to exert an axial force on said strut equal to and in an opposite direction to said first axial force.

2. An electric current comparison instrument comprising in combination: a frame; a rotary member journaled in said frame; a radially extending indicator carried by said member; a pair of struts each fulcrumed adjacent one end in said frame for swinging movement about a transverse axis; a pair of stretched, electro-conductive, thermal-expansive ligaments each having an end insulated from said frame and anchored therein at a point spaced from said fulcrum axis of one of said struts, the other ends of said ligaments being respectively attached to said struts at points spaced from said fulcrum axes, said ligaments each being disposed at an angle of less than 90° to its connected strut to exert an axial force on the latter, and said ligaments being adapted for connection to separate current sources; and a pair of links, each connected between the unfulcrumed end of one of said struts and an eccentric point on said rotary member, said links extending in opposite tangential directions from said rotary member, whereby moments produced by differential expansile or contractile forces in said ligaments produce swinging movement of said indicator, while the forces produced by simultaneous and equal expansion or contraction of said ligaments balance each other and produce no motion of said indicator.

3. The construction of claim 2 further characterized by having means including an adjustable anchor member in said frame to vary the orientation of at least one of said ligaments with respect to its connected strut whereby to change the vector component of force applied to said strut by said ligament and vary the sensitivity of said instrument.

4. The construction of claim 2 further characterized by having a spring interposed between said frame and said struts to counteract the axial force exerted on said struts by said ligaments.

DOUGLAS CLEGG.
LEIF E. JENSSEN.

References Cited in the file of this patent

UNITED STATES PATENTS

| Number | Name | Date |
|---|---|---|
| 947,266 | Wohl et al. | Jan. 25, 1910 |
| 2,004,421 | Smulski | June 11, 1935 |
| 2,303,216 | Malone | Nov. 24, 1942 |
| 2,313,649 | Liner | Mar. 9, 1943 |

FOREIGN PATENTS

| Number | Country | Date |
|---|---|---|
| 502,065 | Germany | July 7, 1930 |
| 502,066 | Germany | July 8, 1930 |
| 16,042/34 | Australia | July 19, 1934 |